US010366134B2

(12) United States Patent
Quercia et al.

(10) Patent No.: US 10,366,134 B2
(45) Date of Patent: Jul. 30, 2019

(54) TAXONOMY-BASED SYSTEM FOR DISCOVERING AND ANNOTATING GEOFENCES FROM GEO-REFERENCED DATA

(71) Applicant: Oath Inc., New York, NY (US)

(72) Inventors: Daniele Quercia, Barcelona (ES); Francesco Bonchi, Barcelona (ES); Carmen Vaca, Barcelona (ES)

(73) Assignee: Oath Inc., New York, NY (US)

( * ) Notice: Subject to any disclaimer, the term of this patent is extended or adjusted under 35 U.S.C. 154(b) by 457 days.

(21) Appl. No.: 14/523,709

(22) Filed: Oct. 24, 2014

(65) Prior Publication Data

US 2016/0117379 A1    Apr. 28, 2016

(51) Int. Cl.
| G06F 17/30 | (2006.01) |
| G06F 16/9537 | (2019.01) |
| H04W 4/021 | (2018.01) |
| G06F 16/28 | (2019.01) |
| G06F 16/29 | (2019.01) |

(52) U.S. Cl.
CPC ........ *G06F 16/9537* (2019.01); *G06F 16/285* (2019.01); *G06F 16/29* (2019.01); *H04W 4/021* (2013.01)

(58) Field of Classification Search
CPC .......... G06F 17/30241; G06F 17/3087; G06F 17/30598; G06F 16/9537
USPC ....................................... 707/603
See application file for complete search history.

(56) References Cited

U.S. PATENT DOCUMENTS

| 6,025,843 A | * | 2/2000 | Sklar | ............... G06F 17/30241 715/841 |
| 2001/0030667 A1 | * | 10/2001 | Kelts | .................. G06F 3/0481 715/854 |
| 2011/0047509 A1 | * | 2/2011 | Arrasvuori | ......... G01C 21/3673 715/815 |
| 2013/0031458 A1 | * | 1/2013 | Java | .................... G06F 16/9537 715/234 |
| 2014/0095296 A1 | * | 4/2014 | Angell | ............... G06Q 30/0246 705/14.45 |
| 2015/0005012 A1 | * | 1/2015 | Wang | .................... H04W 4/021 455/456.3 |
| 2016/0004738 A1 | * | 1/2016 | Kerfoot | ............. G06F 17/30327 707/743 |
| 2018/0232840 A1 | * | 8/2018 | Liu | .......................... G06F 7/08 |

OTHER PUBLICATIONS

Yuan, Jing et al.; "Discovering Regions of Different Functions in a City Using Human Mobility and POIs", *ACM KDD* '12 Beijing, China; Copyright 2012 ACM 978-1-4503-1462-6 /Dec. 2008, 9 pages.

(Continued)

*Primary Examiner* — Thu Nguyet T Le
(74) *Attorney, Agent, or Firm* — Cooper Legal Group, LLC (57) ABSTRACT

Systems and methods for discovering and annotating geofences from geo-referenced data are disclosed. The systems and methods input an area of interest containing a plurality of geo-referenced points having associated labels, and divides the area interest into cells. Each cell is assigned an initial label from among the plurality of labels and hierarchical clustering is used to find clusters of cells having a common label based on a maximization of an objective function for each cell with the objective function being dependent upon favoring spatially adjacent cells having a common label and limiting overgeneralization of the common label.

4 Claims, 4 Drawing Sheets

(56) References Cited

OTHER PUBLICATIONS

Duan, Lian et al.; "A local-density based spatial clustering algorithm with noise", www.sciencedirect.com, Information Systems 32 (2007), pp. 978-986.

* cited by examiner

TAXONOMY-BASED SYSTEM FOR DISCOVERING AND ANNOTATING GEOFENCES FROM GEO-REFERENCED DATA

BACKGROUND

1. Technical Field

The disclosed embodiments are related to mobile marketing and more particularly to discovering and annotating functional areas.

2. Background

Rapid urbanization calls for new ways of capturing the composition of cities. To discover functional areas in a city, spatial discovery algorithms have been recently applied to social media (e.g., Foursquare) data: functional areas are often identified based on semantic annotations of places and human mobility patterns. These algorithms have, however, considered the formation of functional areas and their semantic annotation as two separate steps. As a result, the derived areas might not be the best ones to be unambiguously annotated.

By 2025, there will be an additional 1.2 billion people living in cities. Given its scale, urbanization comes with enormous economic benefits. Those benefits will be only realized, however, by managing the increased complexity associated with larger cities: resources are scarce, and allocating them in a timely fashion is key. A quick understanding of a complex city might be provided by new ways of discovering functional areas. These functional areas might benefit a variety of stakeholders such as: tourists who look for historical sites; locals who are after niche shopping; retail analysts who have to recommend where new brick-and-mortar shops are best placed.

After discovering functional areas, they need to be annotated. However, area annotation is still a very challenging problem in traditional urban planning. That is because existing approaches rely on topic-based inference models or segmentation techniques that can describe an area as a frequency distribution of its representative categories at best. By representative, it is meant categories that are most frequent in the area or that occur in that area more than chance.

The simplest way of finding functional areas is to use a spatial clustering technique. One of the most common techniques is the Density-based Spatial Clustering of Applications with Noise (DBScan). It finds a number of clusters starting from the estimated density distribution of points, and has been recently used on Foursquare data in the three cities of New York, London, and Paris. To test the hypothesis that a modern city functions as a 'social archipelago' (i.e., "a fragmented set of islands characterized by high-density social activity"), the Foursquare venues were modeled as geo-located points and it was found that Paris is less spatially fragmented than London; by contrast, New York is the most fragmented, twice as much as Paris.

Most of the latest research effort has gone into finding functional areas in the city. Researchers have done so in three main ways. The first way has relied on grouping together semantically-annotated points of interests. Popular signatures (e.g., frequency distribution of different types of buildings) may be identified to find urban patches that frequently occur in different parts of the city. For example, the signature of residential areas might well be the high presence of single houses and garages.

A second way of finding functional areas has relied on human mobility. Mobility may be derived from mobile phone traces or Foursquare check-ins. The premise of those approaches is that people's movements signal the potential and intrinsic relations among locations. In this vein, by tracking where Foursquare users check-in, the approach is able to move beyond the politically-defined boundaries of neighborhoods and discover areas that effectively reflect the character and life of city areas.

A third (and latest) way of finding functional areas is to combine semantic annotations with human mobility. The functions of each area may be inferred using a topic-based inference model: areas are modeled as documents, functions as topics, categories as metadata, and human mobility patterns as words. This way of discovering functional areas was found to be far more effective than if one were to apply Term Frequency-Inverse Document Frequency (TF-IDF) or Latent Dirichlet AllocationLDA on the same datasets. Indeed, if one were to gather all the Foursquare venues in the city of Barcelona, divide the city map into 100×100 m walkable cells, and color each cell with either the most frequent venue category or the category with the highest TF-IDF score, then the resulting maps would be either too homogeneous or too fragmented.

All the previous approaches find functional areas and, only after that, describe each of the resulting areas by either counting the categories in the area or identifying the area's categories that are salient (those that, e.g., tend to co-occur more than chance). Understanding what an area really means from such descriptions results, however, is a considerable human effort. It would be beneficial to have an improved system for discovering and annotating functional areas.

BRIEF SUMMARY

Embodiment are directed to systems and methods for discovering functional clusters in an area of interest. In one aspect, a computer executable method for discovering functional clusters in an area of interest is disclosed. The method includes, dividing an area of interest into cells, with the area of interest contains a plurality of geo-referenced points, each geo-referenced point associated with a label from among a plurality of labels, assigning each cell an initial label from among the plurality of labels, and applying hierarchical clustering to find clusters of cells having a common label based on a maximization of an objective function for each cell, the objective function being dependent upon favoring spatially adjacent cells having a common label and limiting overgeneralization of the common label. In some embodiments, the initial label is the most popular label within the cell.

In some embodiments, the hierarchical clustering includes assigning each cell to a new cluster, such that the number of clusters equals the number of cells, computing, for each cluster, a contribution to the objective function for each label contained within the cluster to find a label having a maximum value for the objective function for the cluster, assigning, for each cluster, the label having a maximum value for the objective function, identifying cluster pairs that are spatially adjacent to one another, for each cluster pair, computing a contribution to the objective function for each cell within each cluster among the cluster pair using the previously assigned label, and summing the total contribution to result in a cluster pair contribution, for each cluster pair, calculating, for each possible label, a total contribution to the objective function for the cells contained in the cluster pair to find a maximum merged contribution, for each cluster pair, comparing the cluster pair contribution to the merged contribution to find the higher contribution, for each cluster pair having a maximum merged contribution higher than the cluster pair contribution, assigning the cluster pair in a priority queue ranked according to maximum merged contribution of each cluster pair, and for each cluster pair in the priority queue merging the top ranked cluster pair in the priority queue to have a common label, removing the merged cluster pair from the priority queue, updating the priority queue by replacing references to clusters in the merged cluster pair with a reference to the merged cluster pair for each of the cluster pairs remaining in the queue, and updating the contributions of each cluster remaining on the priority queue.

In some embodiments, the objective function is defined as:

$$\Sigma_{a_i \in C_k}(\lambda \Sigma_{j \in [1,n]} w_{i,j} \mathbb{1} \ (l^*(a_i)=l^*(a_j))+ \\ (1-\lambda)(cov(l^*(a_i),a_i)-cov(l^*(a_i),A)));$$

wherein $\alpha_i$ is a cell;
$C_k$ is a cluster;
l is a cell label;
$\lambda$ is a user-defined parameter between 0 and 1; and
$cov(l(a_i))$ is a coverage function.

In another aspect, a system for discovering functional clusters in an area of interest is disclosed. The system includes an input module configured to receive data representing a map of geo-referenced points that are each labeled with categories arranged in a taxonomy, a division module configured to divide the data into cells, a labeling module configured to assign labels to the cells, wherein the label assigned to the cell is dependent upon the labels of the cells neighbors and limiting overgeneralization of the cell labels, a grouping module configured to group the cells into clusters having common labels, and an output module configured to output the clusters of cells having a common label and their associated labels.

In some embodiments, the labeling module initially assigns a label to each cell corresponding to a most popular label in the cell. In some embodiments, the labeling module reassigns a label to at least one cell when groups of cells are clustered. In some embodiments, the labeling module determines a label to assign based on a label that maximizes an objective function for the cell.

In some embodiments, the grouping module is configured to find pairs of spatially adjacent clusters, determine a cluster pair contribution for the cells in the spatially adjacent clusters, determine a maximum merged contribution for cells in the spatially adjacent clusters with each cell having a common label for each possible label in the adjacent clusters, compare the cluster pair contribution to the merged contribution, and merge the cluster pairs when the merged contribution is greater than the cluster pair contribution. In some embodiments, the grouping module is further configured to place the merged cluster pairs in a priority queue ranked according to the merged contribution of the cluster pairs, merge the cluster pairs having the highest priority in the priority in the priority queue, and update the contribution of the remaining cluster pairs in the priority queue using the merged cluster.

In some embodiments, the cluster output has a geo-referenced boundary. In some embodiments, the system further includes a notification module is configured to notify a user that they are crossing into a new cluster. In some embodiments, the system further includes a mapping module configured to overlay the clusters on an image of a map.

In another aspect, a non-transitory storage medium is disclosed. The non-transitory storage medium has computer executable instruction stored thereon, that when executed by a processor, cause a computing device to perform a method. The method includes dividing an area of interest into cells, wherein the area of interest contains a plurality of geo-referenced points, each geo-referenced point associated with a label from among a plurality of labels, assigning each cell an initial label from among the plurality of labels; applying hierarchical clustering to find clusters of cells having a common label based on a maximization of an objective function for each cell, the objective function being dependent upon favoring spatially adjacent cells having a common label and limiting overgeneralization of the common label. In some embodiments, the the initial label is the most popular label within the cell.

In some embodiments, the hierarchical clustering includes assigning each cell to a new cluster, such that the number of clusters equals the number of cells; computing, for each cluster, a contribution to the objective function for each label contained within the cluster to find a label having a maximum value for the objective function for the cluster; assigning, for each cluster, the label having a maximum value for the objective function; identifying cluster pairs that are spatially adjacent to one another; for each cluster pair, computing a contribution to the objective function for each cell within each cluster among the cluster pair using the previously assigned label, and summing the total contribution to result in a cluster pair contribution; for each cluster pair, calculating, for each possible label, a total contribution to the objective function for the cells contained in the cluster pair to find a maximum merged contribution; for each cluster pair, comparing the cluster pair contribution to the merged contribution to find the higher contribution; for each cluster pair having a maximum merged contribution higher than the cluster pair contribution, assigning the cluster pair in a priority queue ranked according to maximum merged contribution of each cluster pair; and for each cluster pair in the priority queue merging the top ranked cluster pair in the priority queue to have a common label; removing the merged cluster pair from the priority queue; updating the priority queue by replacing references to clusters in the merged cluster pair with a reference to the merged cluster pair for each of the cluster pairs remaining in the queue; and updating the contributions of each cluster remaining on the priority queue.

In some embodiments, the objective function is defined as:

$$\Sigma_{a_i \in C_k}(\lambda \Sigma_{j \in [1,n]} w_{i,j} \mathbb{1} \ (l^*(a_i)=l^*(a_j))+ \\ (1-\lambda)(cov(l^*(a_i),a_i)-cov(l^*(a_i),A)));$$

wherein $a_i$ is a cell;
$C_k$ is a cluster;
l is a cell label;
$\lambda$ is a user-defined parameter between 0 and 1; and
$cov(l(a_i))$ is a coverage function.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, the disclosed embodiments relate to systems and methods for discovering and annotating functional areas. The systems and methods are able to identify and annotate functional areas while balancing uniformity with overgeneralization. The balance may be adjustable using a single parameter.

Network

Figure 1:
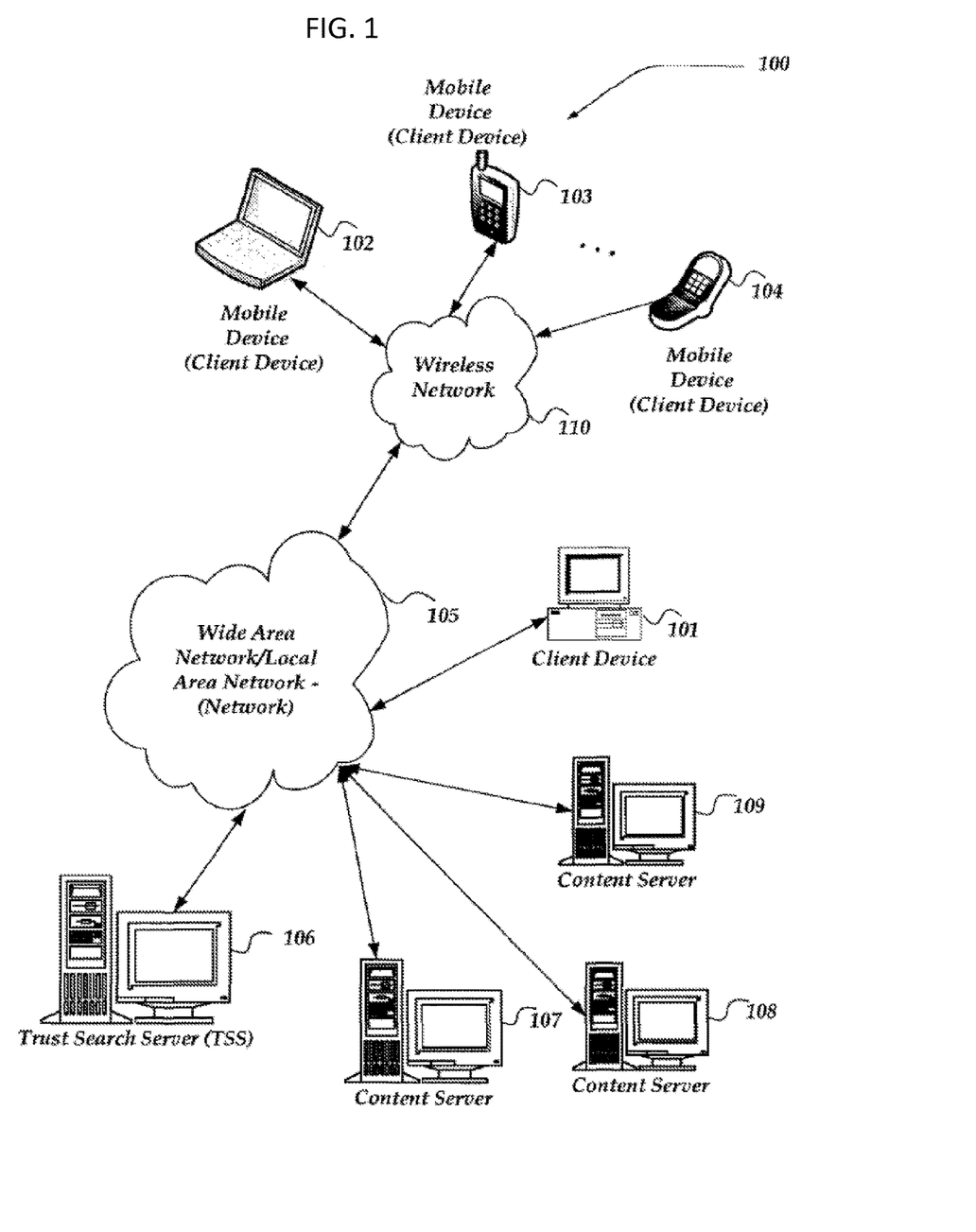
FIG. 1 illustrates an exemplary embodiment of a network system suitable for practicing the invention.

FIG. 1 is a schematic diagram illustrating an example embodiment of a network 100 suitable for practicing the claimed subject matter. Other embodiments may vary, for example, in terms of arrangement or in terms of type of components, and are also intended to be included within claimed subject matter. Furthermore, each component may be formed from multiple components. The example network 100 of FIG. 1 may include one or more networks, such as local area network (LAN)/wide area network (WAN) 105 and wireless network 110, interconnecting a variety of devices, such as client device 101, mobile devices 102, 103, and 104, servers 107, 108, and 109, and search server 106.

The network 100 may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Computing Device

Figure 2:
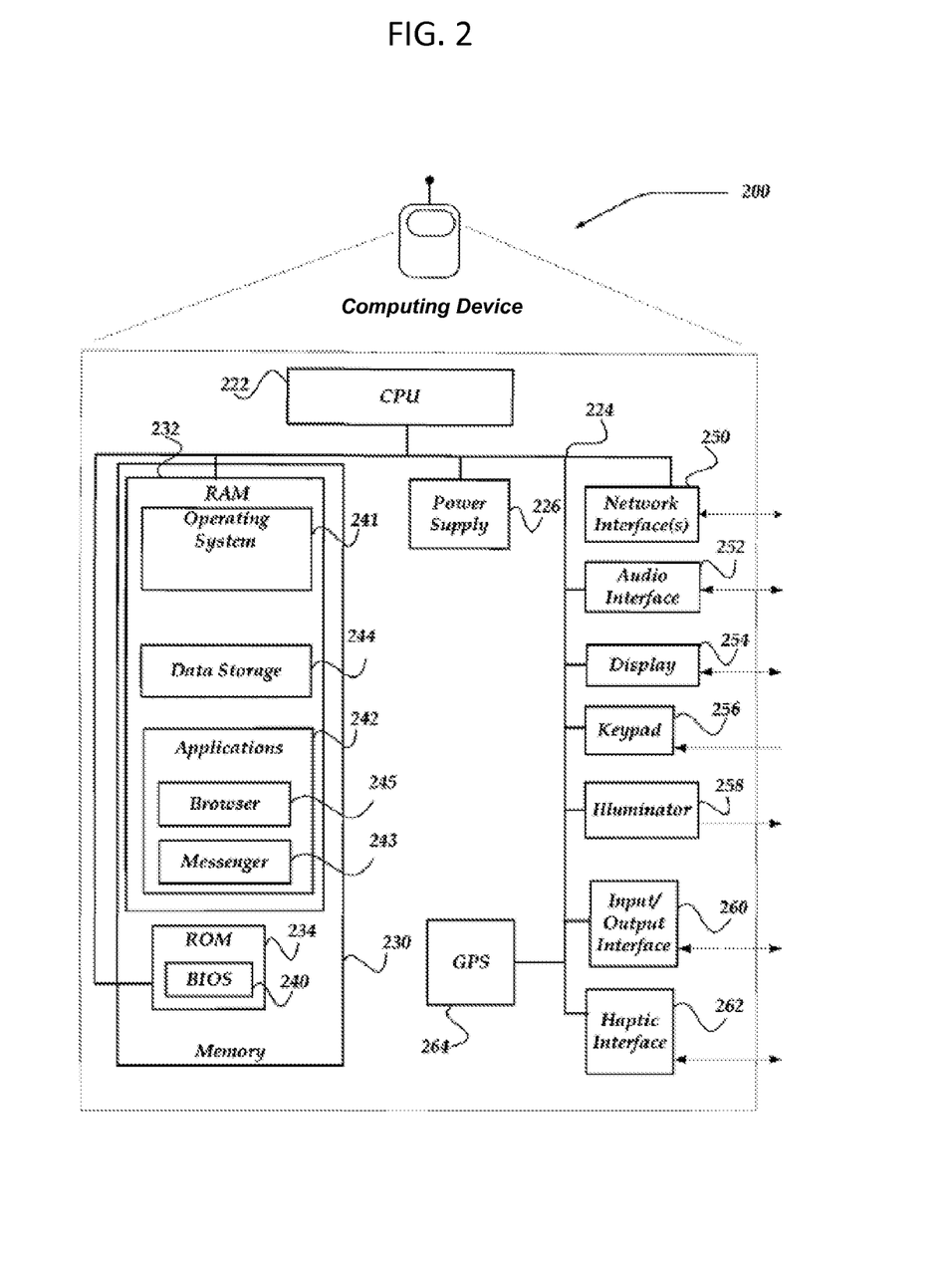
FIG. 2 illustrates a schematic of a computing device suitable for practicing the invention.

FIG. 2 shows one example schematic of an embodiment of a computing device 200 that may be used to practice the claimed subject matter. The computing device 200 includes a memory 230 that stores computer readable data. The memory 230 may include random access memory (RAM) 232 and read only memory (ROM) 234. The ROM 234 may include memory storing a basic input output system (BIOS) 230 for interfacing with the hardware of the client device 200. The RAM 232 may include an operating system 241, data storage 244, and applications 242 including a browser 245 and a messenger 243. A central processing unit (CPU) 222 executes computer instructions to implement functions. A power supply 226 supplies power to the memory 230, the CPU 222, and other components. The CPU 222, the memory 230, and other devices may be interconnected by a bus 224 operable to communicate between the different components. The computing device 200 may further include components interconnected to the bus 224 such as a network interface 250 that provides an interface between the computing device 200 and a network, an audio interface 252 that provides auditory input and output with the computing device 200, a display 254 for displaying information, a keypad 256 for inputting information, an illuminator 258 for displaying visual indications, an input/output interface 260 for interfacing with other input/output devices, haptic feedback interface 262 for providing tactile feedback, and a global positioning system 264 for determining a geographical location.

Client Device

A client device is a computing device 200 used by a client and may be capable of sending or receiving signals via the wired or the wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features and need not contain all of the components described above in relation to a computing device. Similarly, a client device may have other components that were not previously described. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Servers

A server is a computing device 200 that provides services. Servers vary in application and capabilities and need not contain all of the components of the exemplary computing device 200. Additionally, a server may contain additional components not shown in the exemplary computing device 200. In some embodiments a computing device 200 may operate as both a client device and a server.

Overview

A map of an area may be represented as a graph $G=(A, w)$ with vertex set A and a system of edge weights $\{w_{i,j}\}_{ai,aj \in A}$. The elements of A are referred to as "cells". A taxonomy represented as a tree $T=(V,E)$ is given with $L \subseteq V$ denoted as the set of leaves of T. Finally, an initial labeling function l: $A \to L$ assigns a leaf of the tree to each cell.

The goal is to find a labelling function $l^*:A \to V$ of the cells to any node in the taxonomy tree such that
  the labeling generalizes the initial labeling; that is, the new label $l^*(a)$ of each cell $\alpha \in A$ should be an ancestor of $l^*(a)$ in T;
  adjacent cells have, to the maximum possible extent, the same label in $l^*$;
  the labelling function do not generalize too much, that is to say, labels closer to the leaves of T are preferable.

There is a natural tradeoff between these objectives. Consider the extreme case in which all the cells are labeled with the root of the tree: on the one hand there would be perfect homogeneity of labeling, but on the other hand the labeling would be over-generalized. At the other extreme, setting $l^*=l$ incurs no generalization cost, but adjacent cells will generally have distinct labels.

Let adv: $V \times A \to \mathbb{R}$ denote a function representing the advantage of assigning each label to each cell. Given a user-defined parameter $\lambda \in [0,1]$, a labeling $l^*:A \to V$ may be found that maximizes:

$$\sum_{a \in A} \left( \lambda \sum_{b \in A} w_{a,b} \Pi[l^*(a) = l^*(b)] + (1-\lambda)adv(l^*(a), a) \right)$$

For a given cell $a \in A$, the first term measures how well the proposed labeling $l^*(a)$ covers a's neighborhood; the second term quantifies how well the proposed labeling covers the cell itself without being too general (i.e., it does not incur into over-generalization).

Note that it may assumed that the graph G is undirected and $w_{a,b} = w_{b,a}$ for all pairs $a,b \in A$; otherwise, simply define a new weight function w' by $$w'_{a,b} = \frac{w_{a,b} + w_{b,a}}{2}.$$

Edge weights, $w_{a,b}$ may be defined as $$\frac{1}{k_a}$$

if a and b are adjacent, and 0 otherwise, where $k_i$ is the number of neighbors of a. Adjacency may be defined as a 'rook case' notion in which the four surrounding cells (above, below, left, right) are considered adjacent.

A coverage function for a label $l \in V$ and a cell $a_i \in A$ may be defined as $cov(l,a_i)=1$ if l is an ancestor of l(a) om T, and zero otherwise. The average coverage of l for the entire map is defined by $$cov(l, A) = \frac{\log 10 \left( 10 + \sum_{i=1}^{n} cov(l, a_i) \right)}{\log 10(n)}$$

The numerator and denominator are log-transformed to account for the skewness of the numerator and for the large number at the denominator. Adv(l,a) may then be defined as $1-cov(l,A)$ if $cov(l,a)=1$, and $-\infty$ otherwise.

If it is assumed that each cell is not initially associated to a unique label, but instead has a distribution over the nodes of T, then l: $L \times A) \to [0,1]$ such that $\forall a \in A, \Sigma_{l \in L} l(l,a)=1$. Given a node of the taxonomy $l \in V$, let $L(l) \subseteq L$ denote the set of nodes contained in the subtree rooted at l. The coverage of l for a given cell $a \in A$ may be defined as $cov(l,a)=A$, $\Sigma_{l \in L_v} l(l, a)$. $cov(l, A)$ may be defined as before, and $adv(l, a)=cov(l, a)-cov(l, A)$.

To find the areas and labeling for the map that maximize the objective function, it would be necessary to test all possible labels assigned to all possible areas and select the configuration for which the function is maximum. Since that would be computationally prohibitive, an efficient way of finding a satisfactory area division and labeling is necessary. To this end, a hierarchical clustering algorithm is used. This allows candidate cluster pairs to be merged in incremental ways, such that each potential merge is independently evaluated and takes place only if the objective function increases as a result. A pseudocode illustrating the algorithm is as follows:

```
1:  procedure HAC(T,A,λ),contr( ))
2:      for each cell a_i in A do
3:          Assign a_i to a newly created cluster C_k
4:          Assign label l to C_k: contr(C_k,l*(C_k)) is max
5:      end for
6:      for each pair of adjacent clusters C_k, C_h do
7:          checkEnqueuePair(C_k , C_h, λ, T)
8:      end for
9:      while (priorityqueue is not empty) do
10:         Get next tuple (M_kh,l_ij,contr(M_kh,l*(M_kh)))
11:         mergePair(C_k,C_h,l_ij, contr(M_kh,l*(M_kh)))
12:         Replace references to C_k and C_h with M_kh
13:         Update contr( ) for each neighbor of M_kh
14:     end while
15: end procedure
```

The algorithm begins with the initial labeling l in which each cell is assigned the most popular label inside it. Next, the hierarchical clustering is applied as follows: Each cell in the map is initially assigned to a new cluster (line 3), resulting in as many clusters as cells. Since any of the candidate labels may be selected, both the labels present in the cell and their ancestors in T, for each cluster $C_k$ it is necessary to compute the contribution to the objective function for each of those labels and select the one that results in the maximum (line 4).

To start merging clusters, only clusters that are adjacent may be merged. By testing which clusters are adjacent and which are not, a reduced set of cluster pairs that may be potentially merged is found (line 6).

In the checkEnqueuePair procedure (line 7), a test is performed to determine whether it is better to merge the two clusters or to keep them separate. For each candidate pair, the first cluster's contribution to the objective function is computed, and the second cluster's contribution is computed. The two contributions are computed considering the two clusters' current labels. The contribution of the first cluster $C_k$ is computed with the previous formula over all $C_k$'s cells, and the contribution of the second cluster $C_h$ is computed summing over all cells in $C_h$. Having those two individual contributions, it is possible to determine whether to merge the two clusters or not. The clusters are merged only if that merging operation contributes to the objective function equally or more than the sum of the two individual contributions; otherwise, the two clusters are best left separate. The contribution of the newly merged cluster $M_{kh}$ is computed with the previous formula: the only difference is that the sum is done over all the cells in both clusters. That contribution contr($M_{kh}$, l*($M_{kh}$)) changes depending on the label assigned to the newly merged cluster. Since it is possible to assign any of the candidate labels (i.e. the intersection of $C_k$ and $C_h$'s candidate labels), the contribution for each of those labels needs to be computed and the ones that result in a non-negative merging benefit selected for the priority queue. By selecting $C_k$ and $C_h$, we mean that we put them in a priority queue in which cluster pairs are ordered by their merging benefits.

After putting all cluster pairs with non-negative merging benefits in the queue, the queue is visited by performing ordered merging operations starting with those with highest benefits (line 10). At each merging operation (line 11), the queue is partly updated (line 12): after combining, say, $C_k$ and $C_h$, the queue is refreshed by replacing all references to $C_h$ and $C_k$ with $M_{kh}$ and updating the contributions to the objective function of $M_{kh}$'s neighbors. The merging operations end when the queue is empty.

Figure 3:
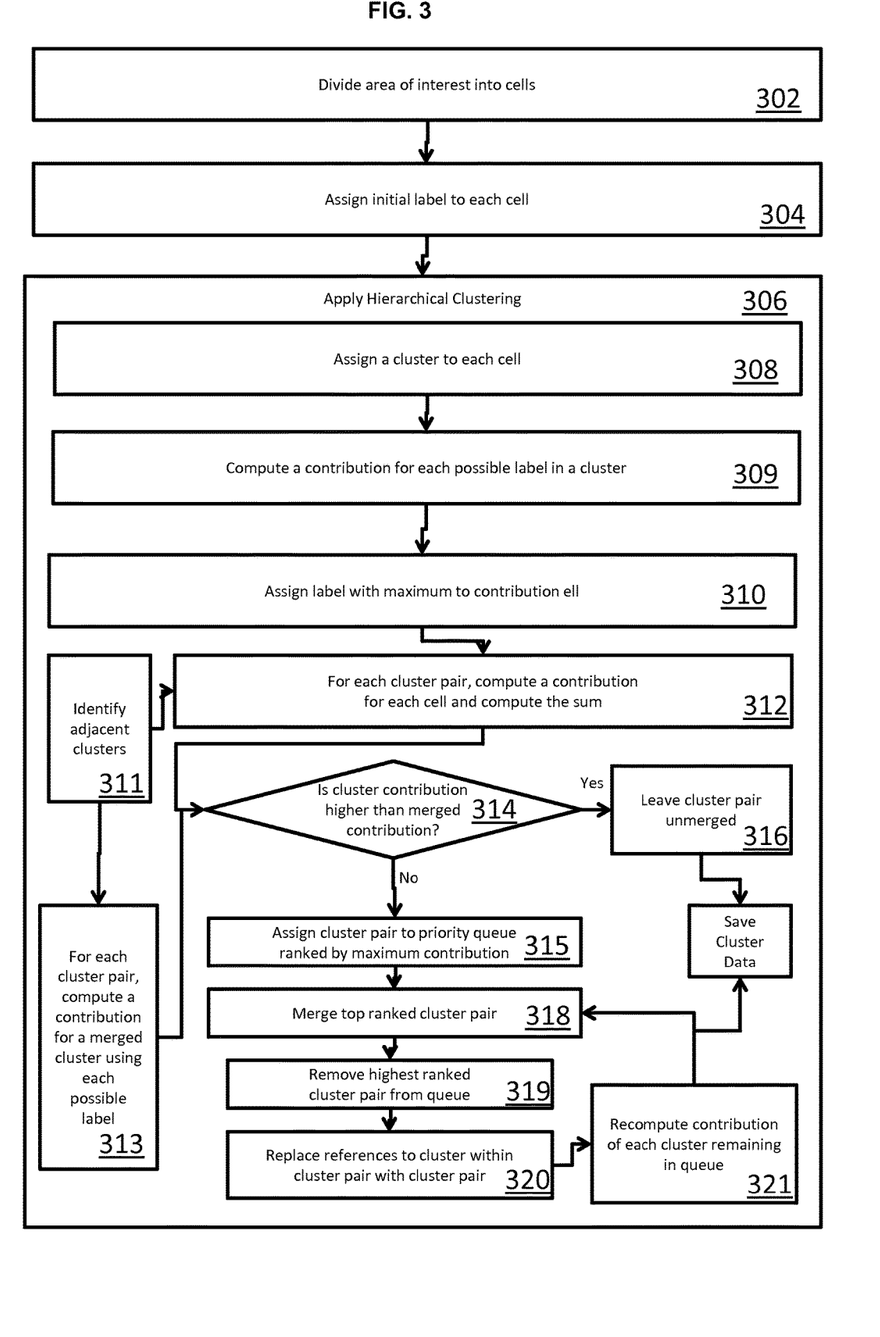
FIG. 3 illustrates a flow chart of a method for discovering and annotating functional clusters in an area of interest.

FIG. 3 illustrates a high level flowchart of a method 300 for discovering and annotating functional areas consistent with the described procedure. The method 300 may be performed on a computing device such as a client device or a server as described previously. A computer readable storage medium may store computer executable instructions for performing the method. In the method, an area of interest is divided into cells at block 302. The area of interest contains a plurality of geo-referenced points, and each geo-referenced point is associated with a label from among a plurality of labels. A geo referenced point is a point that corresponds to a geographical location such as an address or global positioning system coordinates. The label is a word or phrase that is semantically associated with a point. A label may vary in descriptiveness depending on the level of detail required by a user. A broader label, such as "professional places" will have a broader reach than a specific label such as "clothing store."

In block 304, an initial label is assigned to each of the cells from among the plurality of labels. The initial label may be the label that is the most popular label in the cell. For example, if a cell had a plurality of clothing store labels, the initial labels for cell may be assigned as "clothing store." Other techniques are possible, such as randomly assigning a label from within the cell. However, assigning the initial label as the most popular label generally results in reduced computation and increased accuracy compared to other methods.

In block 306, hierarchical clustering, such as that described previously, is utilized to determine clusters of cells to assign a common label based on a maximization of an objective function for each cluster, the objective function being dependent upon favoring spatially adjacent cells having a common label and limiting overgeneralization of the common label.

The hierarchical clustering may be further broken down into a series of actions as designated by blocks 308-320. In block 308, each cell is assigned to a new cluster such that the number of clusters equals the number of cells. This initializes the clusters for starting the algorithm.

In block 309, a contribution to the objective function for each label contained within the cluster is computed to find a label having a maximum value for the objective function for the cluster. In computation, the contribution is calculated using the initial labels assigned to the individual clusters. The contribution is calculated for each possible label in the cluster to find the label having the greatest contribution.

In block 310, the label having the maximum contribution for a given cluster is assigned to the cluster. In block 311, cluster pairs that are spatially adjacent to one another are identified. This block 311, may be performed prior to the labeling of the clusters since the cells within the clusters do not move during the calculation of the maximum contribution. For each cluster pair, in block 312, a contribution to the objective function is calculated for each cell within the cluster pair using the assigned labels, and the total contribution of the cell in the cluster pair is summed to determine a cluster pair contribution.

To determine whether to merge the cluster pair, the cluster pair contribution is compared to a maximum merged contribution to determine which has a higher contribution. If the contribution is higher by not pairing the cluster pair, then no merge is performed. To determine the maximum merged contribution, at block 313, a contribution for each of the cells in the cluster is determined using each possible label in the cluster pair. For example, if there are six cells in one cluster and four possible labels, and four cells in another cluster and three possible labels, a contribution using the first label will be computed for all ten cells and the sum found. The process would then continue calculating a contribution for each of the ten cells using the second label and the sum found. This would continue until the sum was found for each of the seven possible labels. Of course, this is only given as an example and other numbers of cells and labels are possible. Additionally, the labels need not be exclusive such that there may be an overlap of possible labels in each of the clusters. The label resulting in the highest contribution is determined to be the merged contribution.

At block 314, the maximum merged contribution from block 313 is compared to the cluster pair contribution from block 312 to find which is greater. If a cluster pair has a higher maximum merged contribution than the cluster pair contribution, the cluster pair is assigned to a priority queue ranked according to the maximum merged contribution in block 315. If the cluster pair was found to have a greater cluster pair contribution, the cluster pair is left unmerged in block 316.

For each of the cluster pairs in the priority queue, at block 318 the top ranked cluster pair in the priority queue is merged into a single cluster containing the cells in the cluster pair and having a common label corresponding to the label that resulted in the highest merged contribution. The merged cluster pair is then removed from the priority queue at block 319.

In block 320, the priority queue is updated by replacing references to clusters in the merged cluster pair removed from the priority queue with a reference to the merged cluster pair for each of the cluster pairs remaining in the queue. In block 321, the contribution of each cluster remaining on the priority queue is recomputed. This process, continues until there are no more cluster pairs remaining in the queue.

Figure 4:
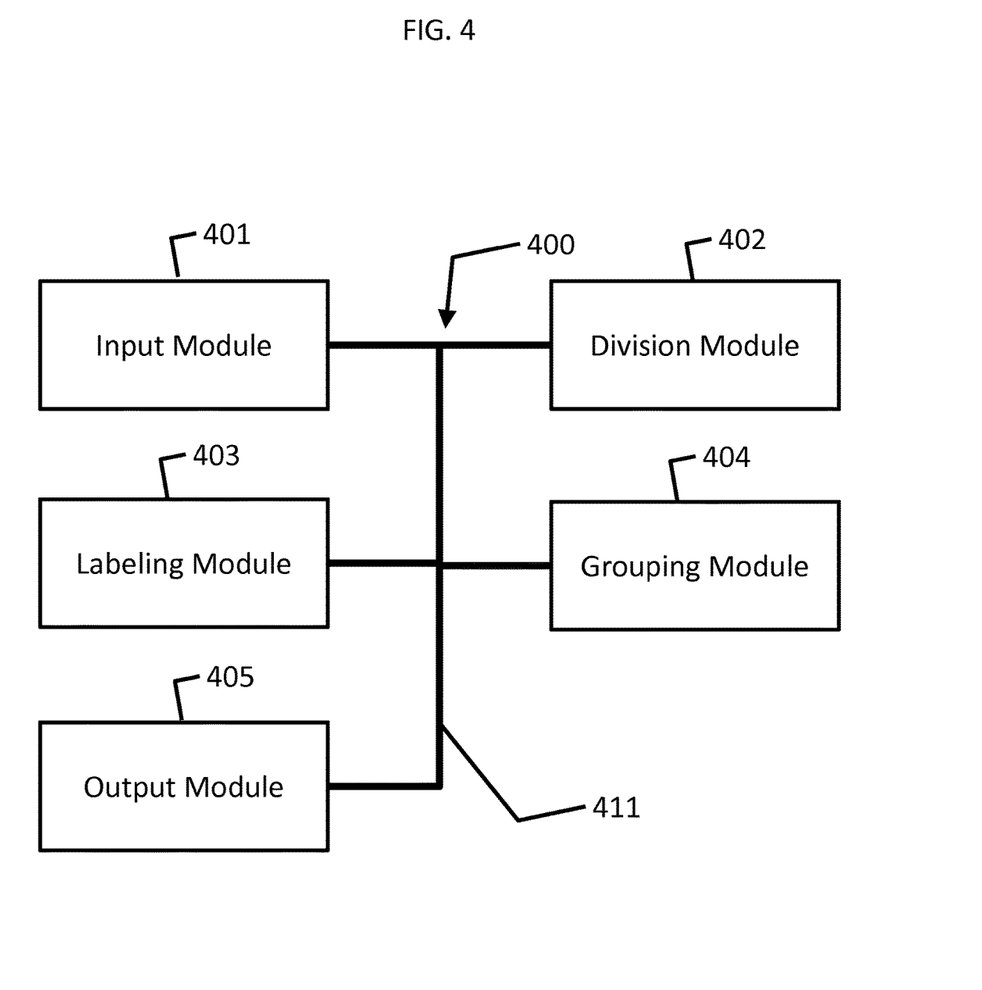
FIG. 4 illustrates a system diagram of a system for discovering and annotating functional clusters in an area of interest.

FIG. 4 illustrates a high level system diagram of a system 400 for discovering functional clusters in an area. The system 400 may be executed as hardware or software modules on a computing device as shown in FIG. 2, or as a combination of hardware and software modules. The modules may be executable on a single computing device or a combination of modules may each be executable on separate computing devices interconnected by a network. FIG. 4 illustrates the system 400 with each module component being connected directly to one another by a bus 411, but they need not be. For example, each module could be connected directly to another module.

The system includes an input module 401 configured to receive data representing a map of geo-referenced points that are each labeled with categories arranged in a taxonomy. A division module 402 is configured to divide the data into geographic cells that may be labeled with labeling module 403. Division module 402 may implement block 302 of method 300. Labeling module 403 is configured to assign labels to the cells with the label assigned to the cell being dependent upon the labels of the cell's neighbors while limiting overgeneralization of the cell labels. Labeling module 403 may assigns a label to each cell corresponding to a most popular label in the cell. Labeling module 403 may further reassigns a label to at least one cell when groups of cells are clustered. The label to assign to a cell may be based on a label that maximizes an objective function for the cell. Labeling module 403 may implement block 304 of method 300.

Grouping module 404 is configured to group the cells into clusters having common labels and output module 405 is configured to output the clusters of cells having a common label and their associated labels. The grouping module 408 may be configured to find pairs of spatially adjacent clusters, determine a cluster pair contribution for the cells in the spatially adjacent clusters, determine a maximum merged contribution for cells in the spatially adjacent clusters with each cell having a common label for each possible label in the adjacent clusters, compare the cluster pair contribution to the merged contribution, and merge the cluster pairs when the merged contribution is greater than the cluster pair contribution. The merged cluster pairs may be placed by the grouping module 408 in a priority queue ranked according to the merged contribution of the cluster pairs, merge the cluster pairs having the highest priority in the priority in the priority queue, and update the contribution of the remaining cluster pairs in the priority queue using the merged cluster. Grouping module 408 may implement block 306 through 321 of method 300.

Output module 410 may output a geo-referenced boundary for the cell clusters. The system 400 may also include a module configured to notify a user that they are crossing into a new cluster and a module configured to overlay the clusters on an image of a map.

From the foregoing, it can be seen that the present disclosure provides systems and methods for discovering and annotating functional clusters from georeferenced data. While the systems and methods were describing using a functional taxonomy, other taxonomies are possible. The system is flexible for use with differing taxonomies such as demographic in which labels relate to demographic information such as age, gender, or profession. Another example taxonomy is weather, in which labels may correspond to clusters people visit depending on weather.

While various embodiments have been described above, it should be understood that they have been presented by way of example only, and not limitation. It will be apparent to persons skilled in the relevant arts) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A computer executable method for discovering functional clusters in an area of interest, comprising:
    dividing a geographical area of interest into a plurality of cells representative of the geographical area of interest, wherein a cell includes a plurality of geo-referenced points, and wherein each geo-referenced point is associated with a label from among a plurality of labels;
    assigning each cell an initial label corresponding to a label associated with a geo-referenced point included in a respective cell;
    applying hierarchical clustering to create clusters by assigning two or more adjacent cells to a cluster based on a maximization of an objective function that favors spatially adjacent cells sharing a common label;

limiting overgeneralization of the common label while applying the hierarchical clustering;

updating boundaries on a map of the geographical area of interest to identify boundaries of the clusters; and upon detecting a user moving from a first cluster of the clusters to a second cluster of the cluster, notifying a device associated with the user that the user is crossing from the first cluster to the second cluster, wherein the first cluster represents a first portion of the geographical area of interest and the second cluster represents a second portion of the geographical area of interest, wherein the hierarchical clustering comprises:

assigning each cell to a new cluster, such that a number of clusters equals a number of cells;

computing, for each cluster, a contribution to the objective function for each label contained within the cluster to find a label having a maximum value for the objective function for the cluster;

assigning, for each cluster, a cluster label identifying the label having the maximum value for the objective function;

identifying a cluster pair of at least two clusters spatially adjacent to one another;

for the cluster pair, computing a contribution to the objective function for each cell within the cluster pair using the initial label assigned to the cell, and calculating a cluster pair contribution by summing each contribution to the objective function for each cell within the cluster pair;

for the cluster pair, calculating, for each possible label, a total contribution to the objective function for the cells contained in the cluster pair to find a maximum merged contribution;

for the cluster pair, comparing the cluster pair contribution to the maximum merged contribution to find a higher contribution;

for the cluster pair, when the maximum merged contribution is higher than the cluster pair contribution, assigning the cluster pair to a priority queue ranked according to the maximum merged contribution of the cluster pair; and for the cluster pair in the priority queue:

merging a top ranked cluster pair in the priority queue to have at least one common label;

removing the merged top ranked cluster pair from the priority queue;

updating the priority queue by replacing references to clusters in the merged top ranked cluster pair with a reference to the merged top ranked cluster pair for each cluster pairs remaining in the priority queue; and updating contributions of each cluster remaining in the priority queue.

2. The computer executable method of claim 1, wherein the initial label is a most popular label within the cell.

3. The computer executable method of claim 1, wherein the objective function is defined as:

$$\Sigma_{a_i \in C_k}(\lambda \Sigma_{j \in [1,n]} w_{i,j} \mathbb{I}(l^*(a_i)=l^*(a_j)) + (1-\lambda)(\mathrm{cov}(l^*(a_i),a_i) - \mathrm{cov}(l^*(a_i),A)));$$

wherein:

$a_i$ is a cell;

$C_k$ is a cluster;

l is a cell label;

$\lambda$ is a user-defined parameter between 0 and 1; and $\mathrm{cov}(l(a_i))$ is a coverage function.

4. The computer executable method of claim 1, wherein assigning each cell an initial label comprises assigning each cell an initial label based upon a type of commercial activity that occurs with the geographical area of interest represented by the cell.

* * * * *